(12) United States Patent
Lee et al.

(10) Patent No.: US 9,253,397 B2
(45) Date of Patent: Feb. 2, 2016

(54) ARRAY CAMERA, MOBILE TERMINAL, AND METHODS FOR OPERATING THE SAME

(71) Applicants: Jeehong Lee, Seoul (KR); Eunji Shim, Seoul (KR); Hyungmoo Huh, Seoul (KR); Hoseok Do, Seoul (KR)

(72) Inventors: Jeehong Lee, Seoul (KR); Eunji Shim, Seoul (KR); Hyungmoo Huh, Seoul (KR); Hoseok Do, Seoul (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 13/869,240

(22) Filed: Apr. 24, 2013

(65) Prior Publication Data

US 2014/0132735 A1      May 15, 2014

(30) Foreign Application Priority Data

Nov. 15, 2012 (KR) ........................ 10-2012-0129626

(51) Int. Cl.
*H04N 13/02* (2006.01)
*H04N 5/232* (2006.01)
*H04N 5/225* (2006.01)
*H04N 5/247* (2006.01)

(52) U.S. Cl.
CPC ......... *H04N 5/23238* (2013.01); *H04N 5/2258* (2013.01); *H04N 5/23232* (2013.01); *H04N 5/247* (2013.01); *H04N 13/025* (2013.01); *H04N 13/0242* (2013.01)

(58) Field of Classification Search
CPC ............ H04N 13/0239; H04N 13/025; H04N 13/0242
USPC ............................... 346/47, 159; 348/47, 159
See application file for complete search history.

(56) References Cited

U.S. PATENT DOCUMENTS

| 6,469,746 | B1 * | 10/2002 | Maida ........................... 348/564 |
| 2002/0001348 | A1 * | 1/2002 | Yiwen et al. .............. 375/240.26 |
| 2007/0116447 | A1 | 5/2007 | Ye .................................... 369/79 |
| 2008/0211941 | A1 | 9/2008 | Deever et al. ................. 348/262 |
| 2009/0080861 | A1 * | 3/2009 | de Klerk et al. .............. 386/108 |
| 2010/0149338 | A1 | 6/2010 | Aggarwal et al. ............. 348/159 |
| 2012/0050587 | A1 | 3/2012 | Yamamoto |

FOREIGN PATENT DOCUMENTS

WO      WO 2009/073950 A1      6/2009

OTHER PUBLICATIONS

European Search Report dated Jan. 17, 2014 issued in Application No. 13 00 2023.

* cited by examiner

*Primary Examiner* — Michael Lee
(74) *Attorney, Agent, or Firm* — KED & Associates LLP

(57) ABSTRACT

An array camera, a mobile terminal, and methods for operating the same are disclosed. The method for operating an array camera including a plurality of camera modules includes applying a different camera environment setting from the other camera modules to at least one of the plurality of camera modules, acquiring images through the plurality of camera modules, and combining the acquired images.

17 Claims, 21 Drawing Sheets

FIG. 2
(a)
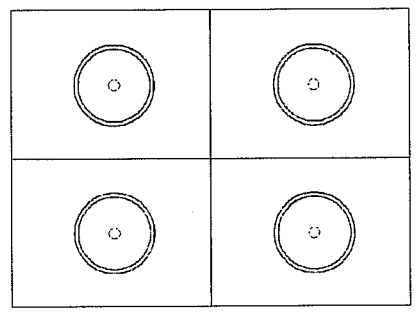
(b)
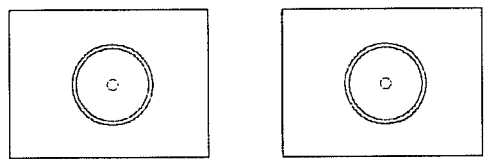
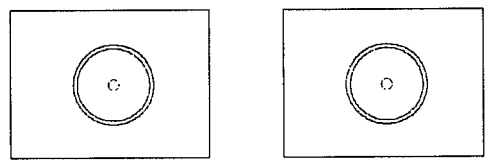
(c)
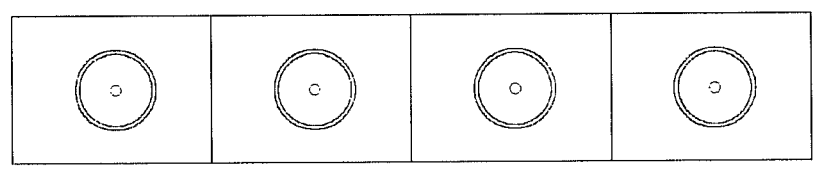
(d)
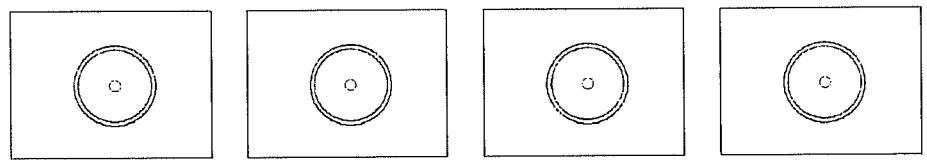

FIG. 4
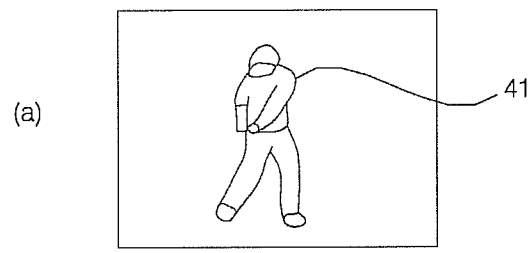
(a)
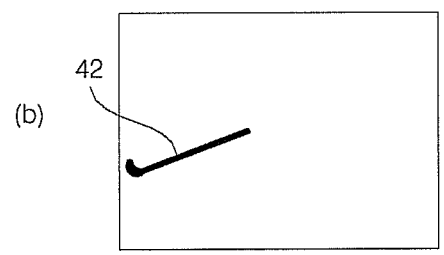
(b)
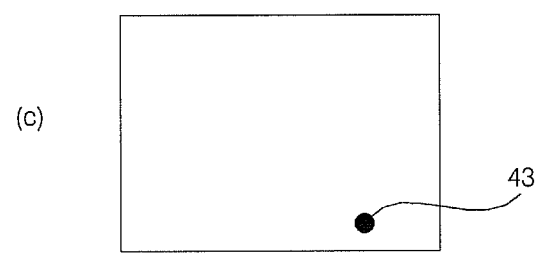
(c)
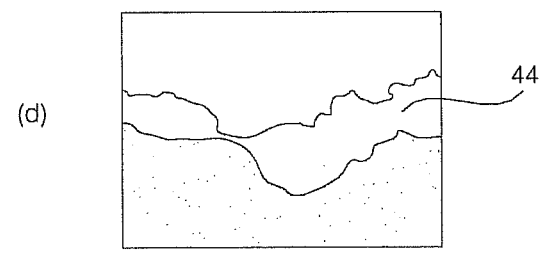
(d)

FIG. 18
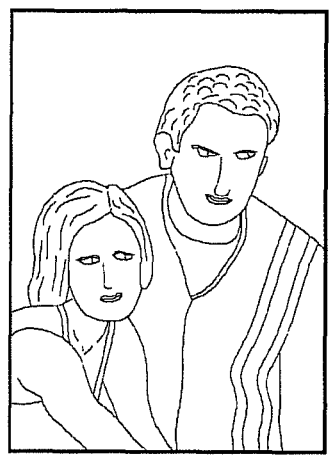
FIG. 19
(a) 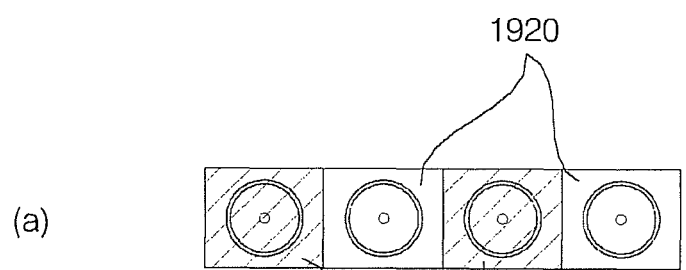
(a) 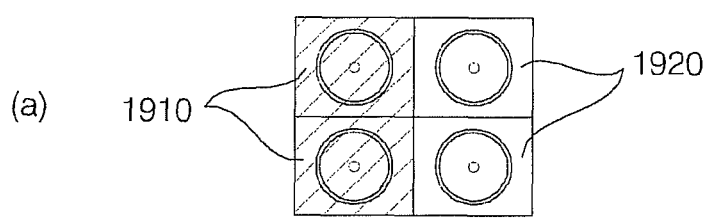

FIG. 20
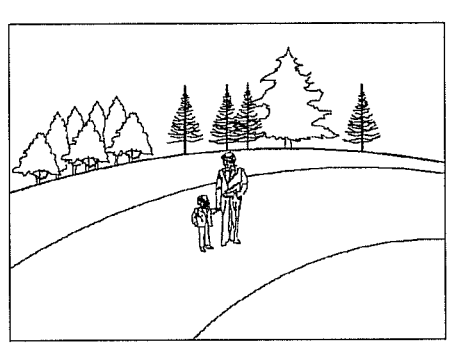
(a)
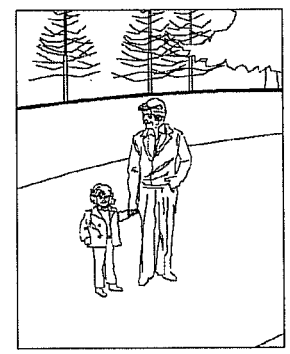
(b)
FIG. 21
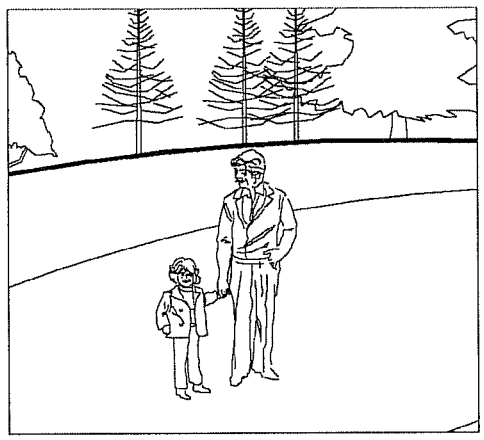

FIG. 23
FIG. 24
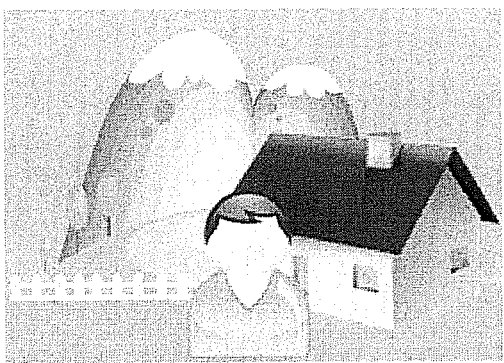
(a)                         (b)

FIG. 25
 
(a)                          (b)

ARRAY CAMERA, MOBILE TERMINAL, AND METHODS FOR OPERATING THE SAME

CROSS-REFERENCE TO RELATED APPLICATION

This application claims the benefit of Korean Patent Application No. 10-2012-0129626, filed on Nov. 15, 2012 in the Korean Intellectual Property Office, the disclosure of which is incorporated herein by reference.

BACKGROUND OF THE INVENTION

1. Field of the Invention

The present invention relates to an array camera, a mobile terminal, and methods for operating the same, and more particularly, to an array camera, a method for operating the array camera, a mobile terminal having the array camera, and a method for operating the mobile terminal.

2. Description of the Related Art

Cameras that acquire specific images, that is, a video and images by capturing an object have been miniaturized. Thus, more and more digital devices such as mobile terminals, Personal Digital Assistants (PDAs), laptops, image display devices, etc. are equipped with cameras.

Along with the trend toward small size and slim-down, intensive research has been conducted on methods for acquiring and recovering high-quality images.

A mobile terminal is a portable device capable of performing one or more of a voice call and video call function, an information input/output function, and a data storing function, while being carried with a user. Along with the diversification of its functions, the mobile terminal has evolved to an integrated multimedia player having complex functions such as picture-taking, video recording, playback of music or a video, gaming, broadcasting reception, and wireless Internet.

To implement complex functions in such a mobile terminal developed into a multimedia player, new attempts have been made in terms of hardware or software. For example, a User Interface (UI) environment is built to render function search or function selection user-friendly.

Furthermore, research is being conducted on efficient utilization and management of pictures or a video captured with a mobile terminal.

SUMMARY OF THE INVENTION

Therefore, the present invention has been made in view of the above problems, and it is an object of the present invention to provide an array camera which can be miniaturized and acquire high-quality images, and a method for operating the same.

It is another object of the present invention to provide a mobile terminal having a mobile terminal equipped with an array camera and a method for operating the same, which can increase user convenience.

In accordance with an aspect of the present invention, the above and other objects can be accomplished by the provision of a method for operating an array camera including a plurality of camera modules, including applying a different camera environment setting from the other camera modules to at least one of the plurality of camera modules, acquiring images through the plurality of camera modules, and combining the acquired images.

In accordance with another aspect of the present invention, there is provided a method for operating a mobile terminal having an array camera including a plurality of camera modules, including applying a different camera environment setting from the other camera modules to at least one of the plurality of camera modules, acquiring images through the plurality of camera modules, and combining the acquired images.

BRIEF DESCRIPTION OF THE DRAWINGS

The above and other objects, features and other advantages of the present invention will be more clearly understood from the following detailed description taken in conjunction with the accompanying drawings, in which:

FIG. 2 illustrates exemplary various layouts of the array camera according to the present invention;

FIGS. 4 and 5 are views referred for describing an array camera and a method for operating the array camera according to an embodiment of the present invention;

FIGS. 10 to 25 are views referred to for describing an array camera, a mobile terminal, and methods for operating the array camera and the mobile terminal according to embodiments of the present invention.

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

Figure 1:
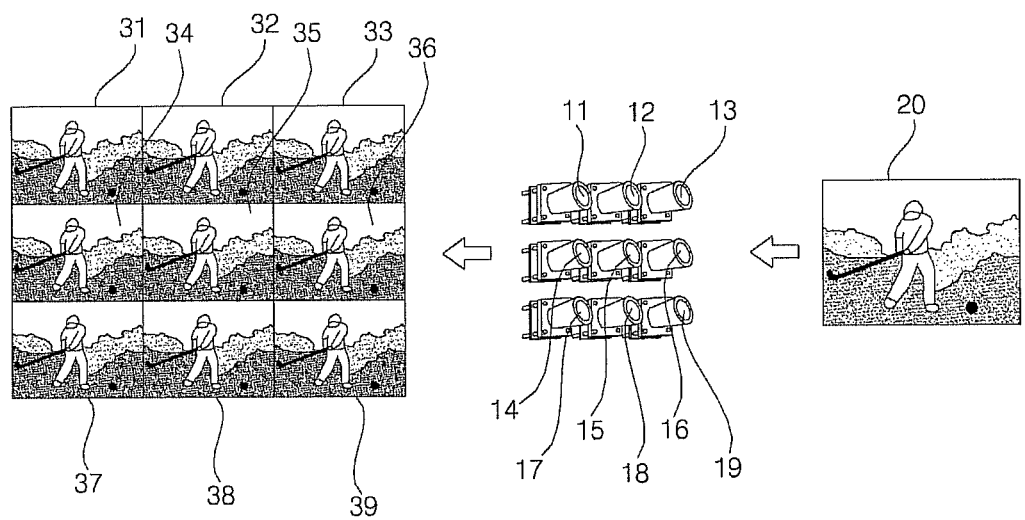
FIG. 1 is a view referred to for describing an array camera and a method for operating the array camera according to an embodiment of the present invention.

FIG. 1 is a view referred to for describing an array camera and a method for operating the array camera according to an embodiment of the present invention.

Referring to FIG. 1, an array camera may include a plurality of camera modules 11 to 19. The plurality of camera modules 11 to 19 may be arranged in an M×N matrix (M and N are 1 or larger integers).

The array camera may acquire still images and a video, that is, images and video data by capturing a specific object with the plurality of camera modules 11 to 19 which may be controlled independently and may capture an image independently.

For example, when the array camera captures a specific object 20, it may acquire a plurality of images 31 to 39 by capturing the same object 20 simultaneously or at predetermined different time points with the plurality of camera modules 11 to 19.

In addition, the array camera may generate a high-quality composite image by combining the acquired images 31 to 39 using at least one of various image combining algorithms.

While the array camera is shown in FIG. 1 as including nine camera modules arranged in a 3×3 matrix, by way of example, the present invention is not limited to the specific example and thus the number and layout of camera modules included in the array camera may vary.

FIG. 2 illustrates exemplary various layouts of the array camera according to the present invention. Specifically, in the case where the array camera includes four camera modules, the camera modules may be arranged in the layouts illustrated in FIG. 2.

In FIG. 2(a), the four camera modules are arranged in a 2×2 matrix. In FIG. 2(b), the four camera modules are arranged in a 2×2 matrix, apart from one another by a predetermined distance.

The four camera modules are arranged in a 1×4 matrix in FIG. 2(c). Although the four camera modules are arranged in a 1×4 matrix, they are spaced from one another by a predetermined distance in FIG. 2(d).

Unlike the layouts of the array camera illustrated in FIG. 2, the four camera modules may be arranged in a 4×1 matrix.

Figure 3:
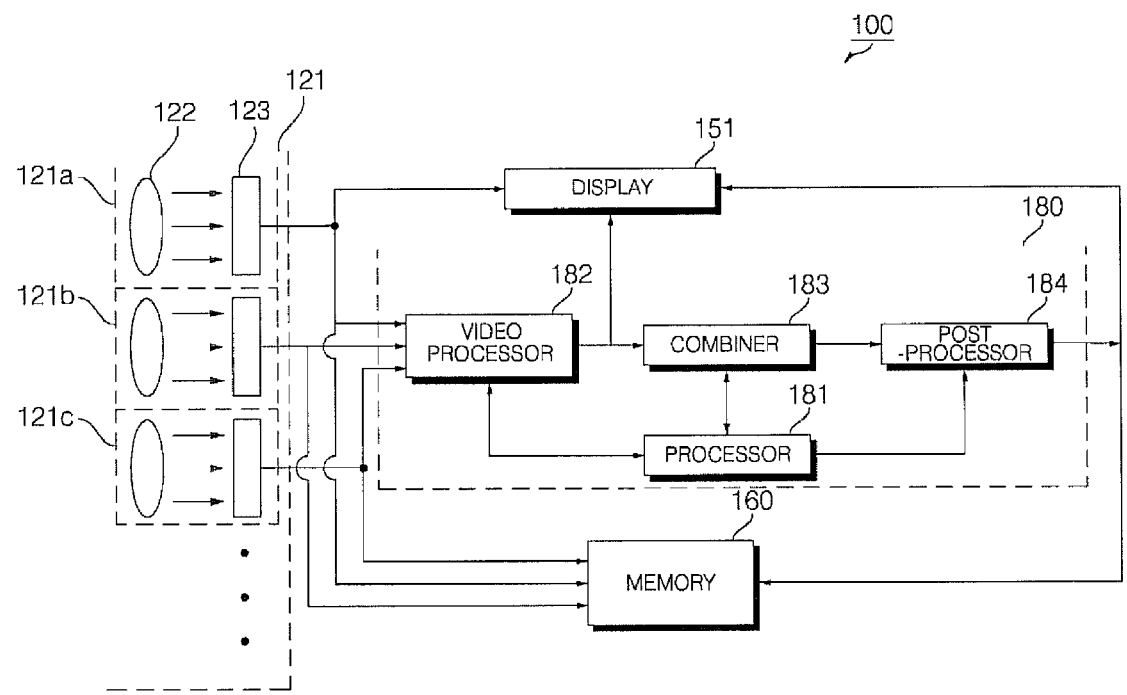
FIG. 3 is a block diagram of the array camera according to an embodiment of the present invention.
Figure 5:
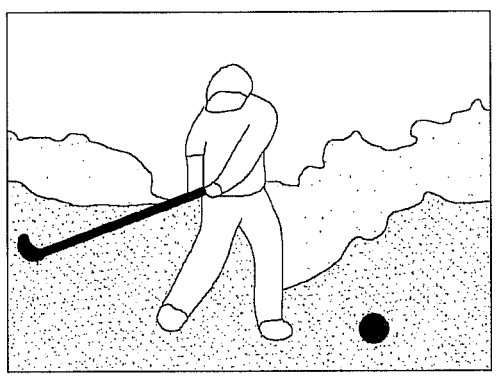

FIG. 3 is a block diagram of the array camera according to an embodiment of the present invention and FIGS. 4 and 5 are views referred for describing the array camera and a method for operating the array camera according to an embodiment of the present invention.

Referring to FIG. 3, the configuration of an array camera will be described, focusing on components related to image acquisition and image processing. The array camera may include a plurality of camera modules 121, a display 151, a memory 160, and a controller 180. The array camera may further include other components, when needed. For example, the array camera may further include a user input unit (not shown) for receiving a user input and an interface (not shown) for interfacing between the array camera and other electronic devices.

In real implementation, two components may be incorporated into a single component or one component may be separated into two or more components in the array camera 100, when needed.

The camera modules 121 are a plurality of independently controllable camera modules 121a, 121b, 121c, . . . in the present invention. Various known camera modules are available as the camera modules 121a, 121b, 121c, . . . .

Each of the camera modules 121a, 121b, 121c, . . . may include a lens unit 122 and a camera sensor 123.

A user-captured image of an object may be formed on the camera sensor 123 by light collected through the lens unit 122. The camera sensor 123 may function to convert an external image input through the lens unit 122 to image data. For example, the camera sensor 123 may be a Charge Coupled Device (CCD) sensor, a Complementary Metal-Oxide Semiconductor (CMOS) sensor, etc. to which the present invention is not limited.

The camera sensor 123 may operate in normal mode or fast mode. The camera sensor 123 may capture a video in a general manner in the normal mode, while it may capture a video at a fast or ultra-fast pace. Or the camera sensor 123 may operate in a mode in which pictures can be taken at a predetermined number of frames per second.

The lens unit 122 may include a plurality of lenses.

Since resolution increases in proportion to the diameter of a lens, a lens with a larger diameter offers a higher resolution. However, the resulting increase in focal distance makes it difficult to render a camera module small and slim.

On the contrary, a lens with a small diameter is favorable in producing a small, slim camera module, but makes it difficult to obtain a high-resolution, high-quality image.

However, including a plurality of camera modules, the array camera of the present invention can acquire a high-quality image by combining a plurality of images captured with the plurality of camera modules. Therefore, relatively small lenses can be used. Consequently, the camera modules can be made small and slim.

In accordance with an embodiment of the present invention, the lens unit 122 of at least one of the plurality of camera modules 121 may include a lens different from those of the other camera modules 121 in type, magnification, and size.

The controller 180 provides overall control to the array camera 100. The controller 180 may receive image data from each of the camera modules 121 and process the image data.

Referring to FIG. 3, the controller 180 may include a processor 181 for controlling the overall operation of the controller 180, a video processor 182 for processing data received from the plurality of camera modules 121, a combiner 183 for combining a plurality of images or pictures, and a post-processor 184 for processing images or pictures to display or store a composite image or picture.

The video processor 182 may convert analog video data received from the camera sensors 123 to digital video data.

For example, the camera sensors 123 may acquire video frames being electrical analog video data by capturing an object. Each of the video frames may include a plurality of pixels and information about each pixel. The video processor 182 may process the per-pixel information during analog-to-digital video data conversion.

The video processor 182 or the post-processor 184 may perform video processes to enhance video quality, inclusive of color correction, color enhancement, gamma correction, etc.

The combiner 183 may perform main video processing such as image interpretation, image recognition, image effect processing, etc. under the control of the processor 181. For image recognition, the combiner 183 may perform object extraction, area extraction, face recognition, scene recognition, etc. In addition, the combiner 183 may combine a plurality of images.

The combiner 183 may reside in the processor 181.

The display 151 may display the operation state of the array camera 100, a manipulated screen, etc.

The display 151 may receive data to be displayed from the controller 180 and may display a final image or preview image based on the received data.

Or the display 151 may display an image received from a preset reference camera module 121a among the plurality of camera modules 121 as a preview image according to a setting.

The controller 180 may control use of at least two of the camera modules 121 as a stereoscopic camera capable of capturing an object three-dimensionally.

The controller 180 may create a depth map by processing a plurality of images acquired with the plurality of camera modules 121. The depth map may be used as reference data for effective image combination as well as for three-dimensional (3D) imaging.

In accordance with an embodiment of the present invention, the controller 180 may identify objects from image data by a known image analysis technique. The controller 180 may analyze at least one of the edge, size, color, brightness, and motion property of an object included in a plurality of images. These parameters may correspond to depth cues.

Motion properties may be checked, such as the colors, brightness, clearness, and sizes of an object and a background and presence of an image motion in the object and background.

The time order of objects may also be determined. The time order of non-overlapped objects displayed on the same screen as well as overlapped objects may be used in setting depth values during two-dimension (2D) to 3D conversion or in combining images.

The depth cues are a factor by which a perspective inherent to a 2D image may be determined. The controller 180 may generate a depth map based on the depth cues.

For example, the depth cues are divided into static cues including texture gradient, linear perspective, atmospheric perspective, and shading and dynamic cues including motion parallax and kinetic depth effect.

The controller 180 may control the plurality of camera modules 121 to automatically focus on different objects.

The controller 180 may extract objects from a plurality of images. In the example of FIG. 1 illustrating a plurality of images, a person 41, a golf club 42, a golf ball 43, and a background 44 may be extracted as illustrated in FIG. 4. The controller 180 may combine the extracted objects into a composite image as illustrated in FIG. 5.

The controller 180 may refer to the depth map in combining the objects.

Or the controller 180 may select a focus from the plurality of images, generate a depth map based on the focus, and combine the plurality of images using the depth map.

Or the controller 180 may use various image combining techniques including High Dynamic Range (HDR) photography.

The controller 180 illustrated in FIG. 3 is purely exemplary. Each component of the controller 180 may be configured separately outside the controller 180. It is also possible to implement the components of the controller 180 as a program.

Two or more components of the controller 180 may be incorporated into a single component, or one component of the controller 180 may be separated into two or more components. In addition, a new component which is not illustrated in FIG. 3 may be added to the controller 180.

The memory 160 may store a program required for operating the array camera and data obtained during operations of the array camera. When needed, the array camera may be provided with a buffer for temporarily buffering data.

Figure 6:
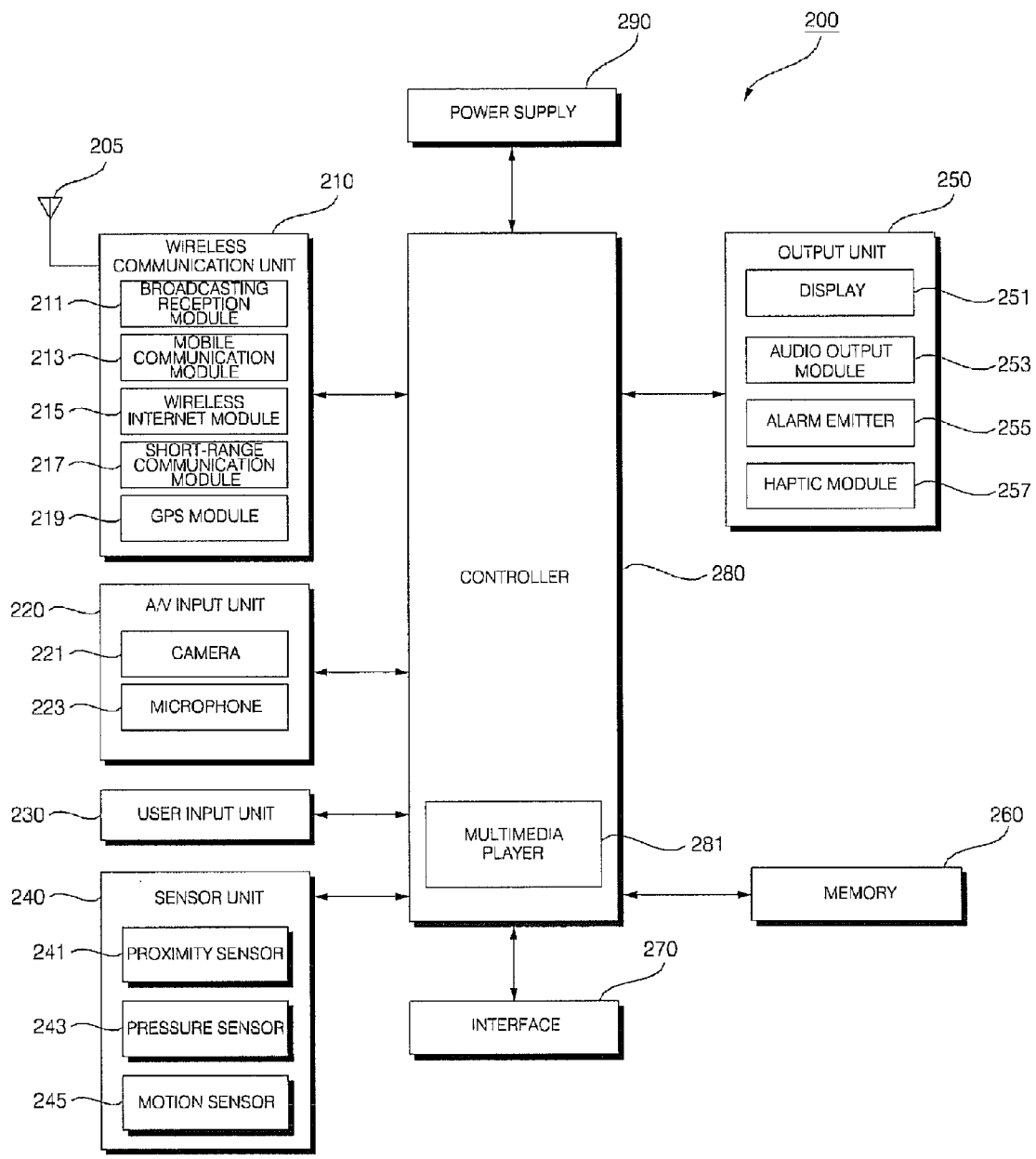
FIG. 6 is a block diagram of a mobile terminal according to an embodiment of the present invention.

FIG. 6 is a block diagram of a mobile terminal according to an embodiment of the present invention.

A mobile terminal as set forth herein may be any of a portable phone, a smart phone, a laptop computer, a digital broadcast terminal, a Personal Digital Assistant (PDA), a Portable Multimedia Player (PMP), a camera, a navigator, a tablet computer, an e-book reader, etc.

With reference to FIG. 6, functional components of the mobile communication terminal will be described below.

Referring to FIG. 6, a mobile terminal 200 may include a wireless communication module 210, an Audio/Video (A/V) input unit 220, a user input unit 230, a sensor unit 240, an output unit 250, a memory 260, an interface 270, a controller 280, and a power supply 290. Two or more components of the mobile terminal 200 may be combined into a single component or a single component thereof may be separated into two or more components in alternative embodiments. For example, a camera 211, particularly an array camera may reside in the A/V input unit 220. Or the array camera 221 may be configured separately from the A/V input unit 220.

The wireless communication module 210 may include a broadcasting reception module 211, a mobile communication module 213, a wireless Internet module 215, a short-range communication module 217, and a Global Positioning System (GPS) module 219.

The broadcasting reception module 211 receives at least one of a broadcast signal or broadcasting-related information on a broadcast channel from an external broadcasting management server. The broadcast channel may be any of a satellite channel, a terrestrial channel, etc. The broadcasting management server may refer to a server for generating and transmitting at least one of a broadcast signal or broadcasting-related information or a server for receiving at least one of an already generated broadcast signal or already generated broadcasting-related information and providing the received at least one of the broadcast signal or the broadcasting-related information to terminals.

The broadcast signal may be a TV broadcast signal, a radio broadcast signal, a data broadcast signal, or a combination of the TV broadcast signal and the data broadcast signal or the radio broadcast signal and the data broadcast signal. The broadcasting-related information may be information related to a broadcast channel, a broadcast program, or a broadcast service provider. The broadcasting-related information may be provided over a mobile communication network. In this case, the mobile communication module 213 may receive the broadcasting-related information. The broadcasting-related information may take various forms.

The broadcasting reception module 211 may receive a broadcast signal through a broadcasting system, particularly a digital broadcast signal through a digital broadcasting system such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), or Integrated Services Digital Broadcast-Terrestrial (ISDB-T). The broadcasting reception module 211 may be adapted to all other broadcasting systems that provide broadcast signals as well as the digital broadcasting system. The broadcast signal and/or broadcasting-related information received at the broadcasting reception module 211 may be stored in the memory 260.

The mobile communication module 213 transmits a radio signal to and receives a radio signal from at least one of a Base Station (BS), an external terminal, or a server over a mobile communication network. The radio signal may include a voice call signal, a video call signal, or text/other various types of data involved in multimedia message transmission and reception.

The wireless Internet module 215 is a built-in or external module for providing wireless Internet connectivity to the mobile terminal 200. The wireless Internet module 215 may operate in conformance to Wireless Local Area Network (WLAN) (Wireless Fidelity (WiFi)), Wireless broadband (Wibro), World Interoperability for Microwave Access (WiMAX), High Speed Downlink Packet Access (HSDPA), etc.

The short-range communication module 217 is used for short-range communication. For short-range communication, the short-range communication module 217 may conform to Bluetooth, Radio Frequency Identification (RFID), Infrared Data Association (IrDA), Ultra WideBand (UWB), ZigBee, Near Field Communication (NFC), etc.

The GPS module 219 receives location information from a plurality of GPS satellites.

The A/V input unit 220 is used to receive an audio signal or a video signal and may include the camera 221 and a microphone 223. The camera 221 processes a video frame of a still image or video acquired from an image sensor in video call mode or camera mode. The processed video frame may be displayed on a display 251.

The camera 221 may be an array camera including a plurality of camera modules that can be independently controlled and can acquire images independently.

The video frame processed by the camera 221 may be stored in the memory 260 or transmitted externally through the wireless communication module 210. Two or more cameras 221 may be provided to the mobile terminal 200 depending on the configuration specification of the mobile terminal 200. For example, the cameras 221 may be provided on the front and rear surfaces of the mobile terminal 200. In this case, at least one of the front and rear cameras 221 may be an array camera. Especially, the rear camera is preferably an array camera in order to acquire a high-quality image.

The microphone 223 receives an external audio signal and processes the audio signal to electrical voice data in call mode, recording mode, or voice recognition mode. In the call mode, the processed voice data may be converted to a format transmittable to a BS and output through the mobile communication module 213. Various noise cancellation algorithms are available to the microphone 223 in order to eliminate noise introduced during input of an external audio signal.

The user input unit 230 generates key input data that the user inputs to control the operation of the mobile terminal 200. The user input unit 230 may include a keypad, a dome switch, a (resistive/capacitive) touch pad, etc. to receive a command or information through the user's push or touch manipulation. The user input unit 230 may be configured to operate in a jog wheel or jog fashion involving key rotation, in a joy stick fashion, or in a finger mouse fashion. Especially when a touch pad is layered with the display 251, the resulting structure may be referred to as a touch screen.

The sensor unit 240 senses the current state of the mobile communication terminal 200, such as the open or closed state, position, or user touch of the mobile terminal 200 and generates a sensing signal to control the operation of the mobile terminal 200 according to the sensed state. For example, if the mobile terminal 200 is a sliding phone, the sensor unit 240 may sense whether the sliding phone is opened or closed. In addition, the sensor unit 240 may sense whether the power supply 290 is supplying power or whether the interface 270 is coupled with an external device.

The sensor unit 240 may include a proximity sensor 241, a pressure sensor 243, and a motion sensor 245. The proximity sensor 241 may detect an object approaching the mobile terminal 200 or the existence or absence of an object in the vicinity of the mobile terminal 200 without mechanical contact. The proximity sensor 241 may detect a nearby object based on a change in an alternating or static magnetic field or the variation rate of capacitance. The sensor unit 240 may also sense a surface of the mobile terminal 200 that the user grips. One or more proximity sensors 241 may be provided to the mobile terminal 200 depending on the specification of the mobile terminal 200.

The pressure sensor 243 may determine whether pressure is applied to the mobile terminal 200 and how strong the pressure is. The pressure sensor 243 may be installed at a part of the mobile terminal 200 requiring pressure detection according to the environment in which the mobile terminal 200 is used.

If the pressure sensor 243 is installed on the display 251, a touch input on the display 251 may be identified from a pressed touch input on the display 151, for which a stronger pressure is applied than for the touch input, according to a signal output from the pressure sensor 243. In addition, in case of the pressed touch input, the magnitude of pressure applied to the display 251 may also be known from the signal output from the pressure sensor 243.

If the pressure sensor 243 is disposed at an edge of the mobile terminal 200, the pressure sensor 243 may sense a surface of the mobile terminal 200 that the user grips by detecting pressure.

The motion sensor 245 senses the position or motion of the mobile terminal 200 using an acceleration sensor, a gyro sensor, etc. The acceleration sensor is a device that converts an acceleration change in a direction to an electrical signal. Along with the development of the Micro-ElectroMechanical System (MEMS) technology, acceleration sensors have become popular.

There are a broad range of acceleration sensors from an acceleration sensor that measures a large acceleration value for sensing collision in an airbag system for a vehicle to an acceleration sensor that measures a very small acceleration value for use as input means capable of recognizing fine hands' motions when a game is played. Typically, 2- or 3-axis acceleration sensors are packed into one package or a single z-axis acceleration sensor is used depending on use environments. Accordingly, when not a Z-axis acceleration sensor but an X-axis or Y-axis acceleration sensor is to be used, the acceleration sensor may be erected on a main substrate by means of a substrate fragment.

The gyro sensor measures an angular velocity and thus senses a rotated direction with respect to a reference direction.

The sensor unit 240 may include sensors for user authentication. For example, when user authentication is performed using vital information about a user, the sensor unit 240 may include a sensor for recognizing a body temperature, finger print, iris, face, etc. The sensor unit 240 may include a necessary sensor according to a user authentication method set for the mobile terminal 200.

The output unit 250 outputs an audio signal, a video signal, or an alarm signal. The output unit 250 may include the display 251, an audio output module 253, an alarm emitter 255, and a haptic module 257.

The display 251 displays information processed in the mobile terminal 200. For example, when the mobile terminal 200 is in the call mode, the display 251 displays a UI or Graphical User Interface (GUI) related to a call. In the video call mode or the camera mode, the display 251 may display captured or received images separately or simultaneously and may also display a UI or GUI.

As described before, if a touch screen is configured by layering the display 251 with a touch pad, the display 251 may be used not only as an output device but also as an input device capable of receiving information by a user's touch.

If the display 251 is configured into a touch screen, it may include a touch screen panel, a touch screen panel controller, etc. In this case, the touch screen panel, which is a transparent panel attached on the exterior of the touch screen, may be connected to an internal bus of the mobile terminal 200. The touch screen panel keeps monitoring whether it is touched by a user. Upon detection of a touch input, the touch screen panel provides a signal corresponding to the touch input to the touch screen panel controller. The touch screen panel controller processes the received signal into data and transmits the data to the controller 280 so that the controller 280 may determine the presence or absence of a touch input and may locate a touched point on the touch screen.

The display 251 may be configured into electronic paper (e-paper). E-paper is a kind of reflective display having excellent visual characteristics including a high resolution, a wide viewing angle, and a bright white background, like paper and ink. The e-paper may be formed on any substrate of a material such as plastic, metal, paper, etc. Since the e-paper can keep an image after power is off and does not require a backlight assembly, it lengthens the battery lifetime of the mobile terminal 200. The display 251 may be configured into e-paper using electrostatic-charged hemispherical twist balls, electrophoretic deposition, or microcapsules.

Besides, the display 251 may be configured into at least one of a Liquid Crystal Display (LCD), a thin film transistor-LCD, an Organic Light Emitting Diode (OLED) display, a flexible display, or a 3D display. Depending on implementation of the mobile terminal 200, the mobile terminal 200 may be provided with two or more displays 251. For example, both external and internal displays (not shown) may be mounted to the mobile terminal 200.

The audio output unit 253 outputs audio data received from the wireless communication module 210 or stored in the memory 260 in call termination mode, call mode, recording mode, voice recognition mode, or broadcast reception mode. The audio output module 253 also outputs an audio signal involved in a function performed by the mobile terminal 200, for example, an audio signal related to a call incoming sound, a message reception sound, etc. The audio output module 253 may include a speaker, a buzzer, etc.

The alarm emitter 255 outputs a signal notifying occurrence of an event to the mobile terminal 200. Events of the mobile terminal 200 include call signal reception, message reception, key signal input, etc. The alarm emitter 255 may output an event notification signal in a form other than an audio signal or a video signal. For example, the event notification signal may be output in the form of vibrations. Upon receipt of a call signal or a message, the alarm unit 255 may output a signal notifying the call signal or message reception. Upon receipt of a key signal, the alarm unit 255 may output a feedback signal for the key signal input. Thus, the user is aware of occurrence of an event from a signal output from the alarm unit 255. A signal notifying of occurrence of an event may also be output through the display 251 or the audio output module 253 in the mobile terminal 200.

The haptic module 257 generates various tactile effects that a user can feel. A major example of the tactile effects is vibrations. When the haptic module 257 generates vibrations as tactile effects, the intensity and pattern of the vibrations may be altered. The haptic module 257 may synthesize different vibration effects and output the synthesized vibrations. Alternatively or additionally, the haptic module 257 may output different vibration effects sequentially.

The haptic module 257 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 257 may be configured to enable the user to recognize a haptic effect using the kinesthetic sense of the fingers or the arms. The mobile terminal 200 may include two or more haptic modules 257.

The memory 260 may store programs required for processing and controlling in the controller 280 or temporarily store input or output data (e.g. a phone book, messages, still images, videos, etc.).

The memory 260 may include at least one of a flash memory type storage medium, a hard disk type storage medium, a multimedia card micro type storage medium, a card type memory (e.g., a Secure Digital (SD) or eXtreme Digital (XD) memory), a Random Access Memory (RAM), or a Read-Only Memory (ROM). The mobile terminal 200 may operate a Web storage, which performs the storage function of the memory 260 on the Internet.

The interface 270 interfaces between the mobile terminal 200 and all external devices connected to the mobile terminal 200. The external devices may include a wired/wireless headset, an external charger, a wired/wireless data port, a memory card, a card socket such as a Subscriber Identification Module (SIM) card or a User Identity Module (UIM) card, an audio Input/Output (I/O) port, a video I/O port, an earphone, etc. The interface 270 may receive data or power from such an external device and transfer the data or power to each component of the mobile terminal 200. In addition, the interface 270 may transmit data from the mobile terminal 200 to the external device.

When the mobile terminal 200 is connected to an external cradle, the interface 270 may provide a path for supplying power from the external cradle to the mobile terminal 200 or for transmitting various user-input command signals from the external cradle to the mobile terminal 200.

The controller 280 typically provides overall control to the mobile terminal 200 by controlling the operation of each component. For example, the controller 280 controls and processes voice call, data communication, video call, etc. The controller 280 may include a multimedia player 281 for playing multimedia. The multimedia player 281 may be configured in hardware inside the controller 280 or in software separately from the controller 280.

The power supply 290 may receive power from an external power source or an internal power source and supply power to the other components of the mobile terminal 200.

The mobile terminal 200 having the above-described configuration may be configured to operate in communication systems capable of transmitting data in frames or packets, including a wired/wireless communication system or a satellite communication system.

If the camera 221 is the array camera in the mobile terminal 200, the mobile terminal 200 does not need to redundantly include all components of the array camera illustrated in FIG. 3. Thus it is obvious that components of the array camera can be replaced with their counterparts of the mobile terminal 200.

For example, since the mobile terminal 200 includes the display 251, the mobile terminal 200 does not need to include an additional display for displaying the operation state of the array camera 100, a manipulated screen, a preview image, and a final image unless the additional display is specifically needed.

That is, the controller 180, the display 151, and the memory 160 of the array camera may be replaced with the controller 280, the display 251, and the memory 260 of the mobile terminal 200. The mobile terminal 200 having an array camera of the present invention may operate in the manner described with reference to FIGS. 1 to 5.

Figure 7:
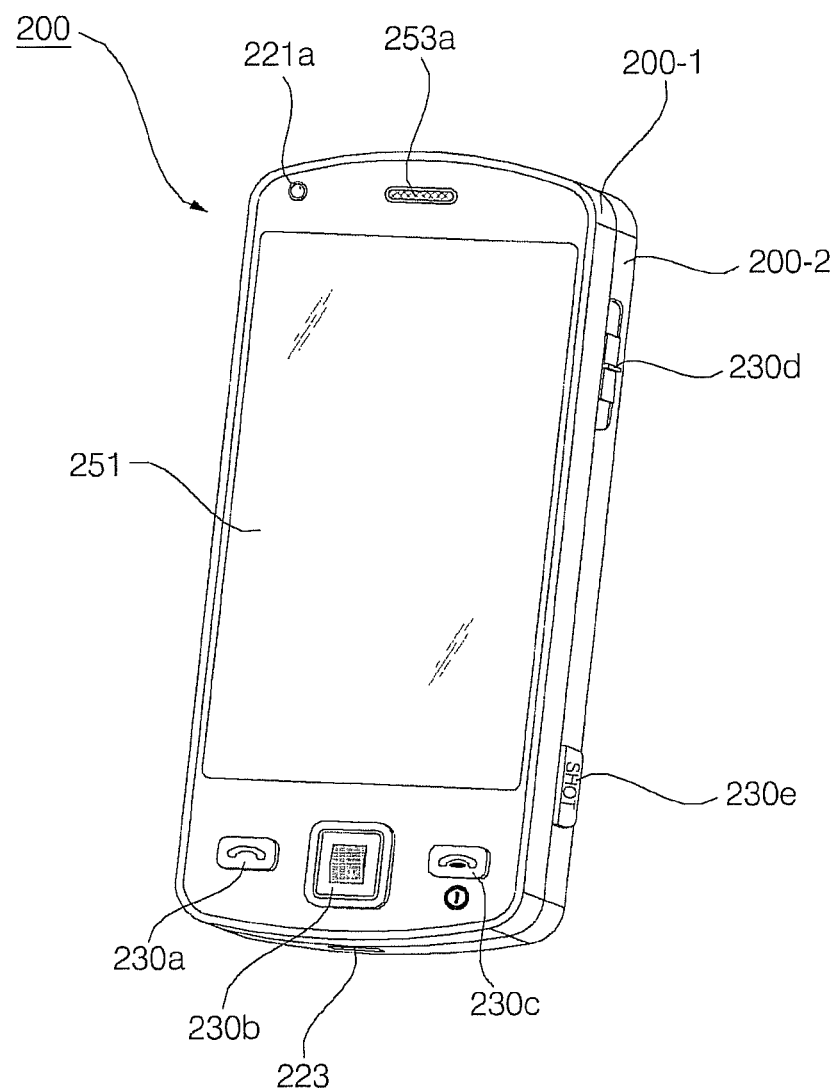
FIG. 7 is a front perspective view of the mobile terminal according to an embodiment of the present invention.
Figure 8:
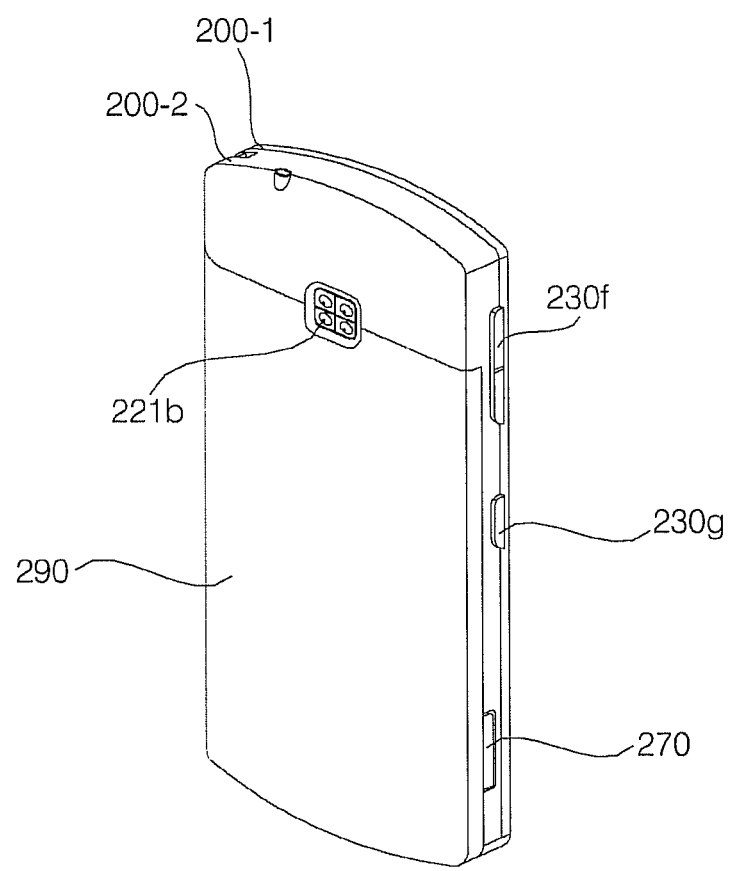
FIG. 8 is a rear perspective view of the mobile terminal according to an embodiment of the present invention.

FIG. 7 is a front perspective view of the mobile terminal according to an embodiment of the present invention and FIG. 8 is a rear perspective view of the mobile terminal illustrated in FIG. 7. With reference to FIGS. 7 and 8, the exterior of the mobile terminal will be described, centering on its exterior components. While the following description is given in the context of a bar-type mobile terminal having a front touch screen, it is purely exemplary. Thus it is to be understood that the present invention is also applicable to other types of mobile terminals including a folder type, a swing type, and a slider type.

Referring to FIG. 7, a front case 200-1 and a rear case 200-2 form the exterior case of the mobile terminal 200. A number of electronic parts are mounted in the space defined by the front case 200-1 and the rear case 200-2.

The display 251, a first audio output module 253a, a first camera 221a, and first, second and third user input units 230a, 230b and 230c may be disposed in a main body of the mobile terminal 200, particularly on the front case 200-1. Fourth and fifth user input units 230d and 230e and the microphone 223 may be disposed on side surfaces of the rear case 200-2.

If a touch pad is layered with the display 251, the display 251 may serve as a touch screen so that the user can enter various types of information to the mobile terminal 200 by touching the display 251.

The first audio output module 253a may be implemented as a receiver or a speaker. The first camera 221a may be configured to be suitable for capturing a still image or video of the user. The microphone 223 may be configured to properly receive the user's voice or other sounds.

The first to fifth user input units 230a to 230e and later-described sixth and seventh user input units 230f and 230g may be collectively referred to as the user input unit 230, and any means can be employed as the first to seventh user input units 230a to 230f so long as it can operate in a tactile manner.

For example, the user input unit 230 may be implemented as a dome switch or a touch pad that can receive a command or information according to a pressing or touch manipulation of the user, or may be implemented as a wheel or jog type for rotating a key or as a joystick. In terms of function, the first, second and third user input units 230a, 230b and 230c may operate as function keys for entering a command such as start, end, or scroll, the fourth user input unit 230d may operate as a function key for selecting an operation mode for the mobile terminal 200, and the fifth user input unit 230e may operate as a hot key for activating a special function within the mobile terminal 200.

Referring to FIG. 8, a second camera 221b may be additionally provided on the rear surface of the rear case 200-2, and the sixth and seventh user input units 230f and 230g and the interface 270 may be disposed on one side surface of the rear case 200-2.

The second camera 221b may have a shooting direction which is substantially the opposite to that of the first camera 221a, and may have a different resolution from that of the first camera 221a. A flash (not shown) and a mirror (not shown) may be additionally disposed in the vicinity of the second camera 221b.

To capture a 3D image, a third camera may further be installed near to the second camera 221b.

At least one of the first and second cameras 221a and 221b may be an array camera having a plurality of camera modules and may be capable of capturing a 3D image. Particularly, the second camera 221b may be an array camera.

When an image of an object is captured with the second camera 221b, the flash may illuminate the object. The mirror may allow the user to see himself or herself when he or she wants to capture his or her own image (self-picture taking) using the second camera 221b.

Another audio output module (not shown) may be additionally provided on the rear case 200-2. The audio output module on the rear case 200-2 may realize a stereo function along with the audio output module 253 on the front case 200-1. The audio output module on the rear case 200-2 may also be used in speaker-phone mode.

The interface 270 may be used as a passage allowing the mobile terminal 200 to exchange data with an external device. A broadcast signal reception antenna (not shown) may be disposed at one side of the front or rear case 200-1 or 200-2, in addition to an antenna used for calls. The broadcast signal reception antenna may be installed such that it can be extended from the rear case 200-2.

The power supply 290 may be mounted in the rear case 200-2 to supply power to the mobile terminal 200. The power supply 290 may be, for example, a chargeable battery which can be detachably mounted to the rear case 200-2 for being charged.

The second camera 221b and the other elements have been described as provided in the rear case 200-2, to which the present invention is not limited.

Even though the second camera 221b is not provided, the first camera 221a may be configured to be rotatable and thus to capture an image in the shooting direction of the second camera 221b.

Figure 9:
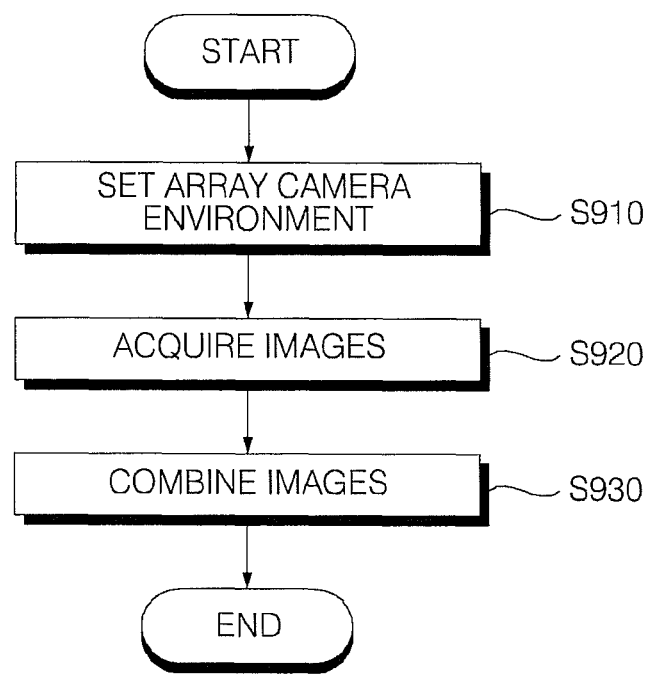
FIG. 9 is a flowchart illustrating methods for operating an array camera and a mobile terminal having the array camera according to an embodiment of the present invention.
Figure 10:
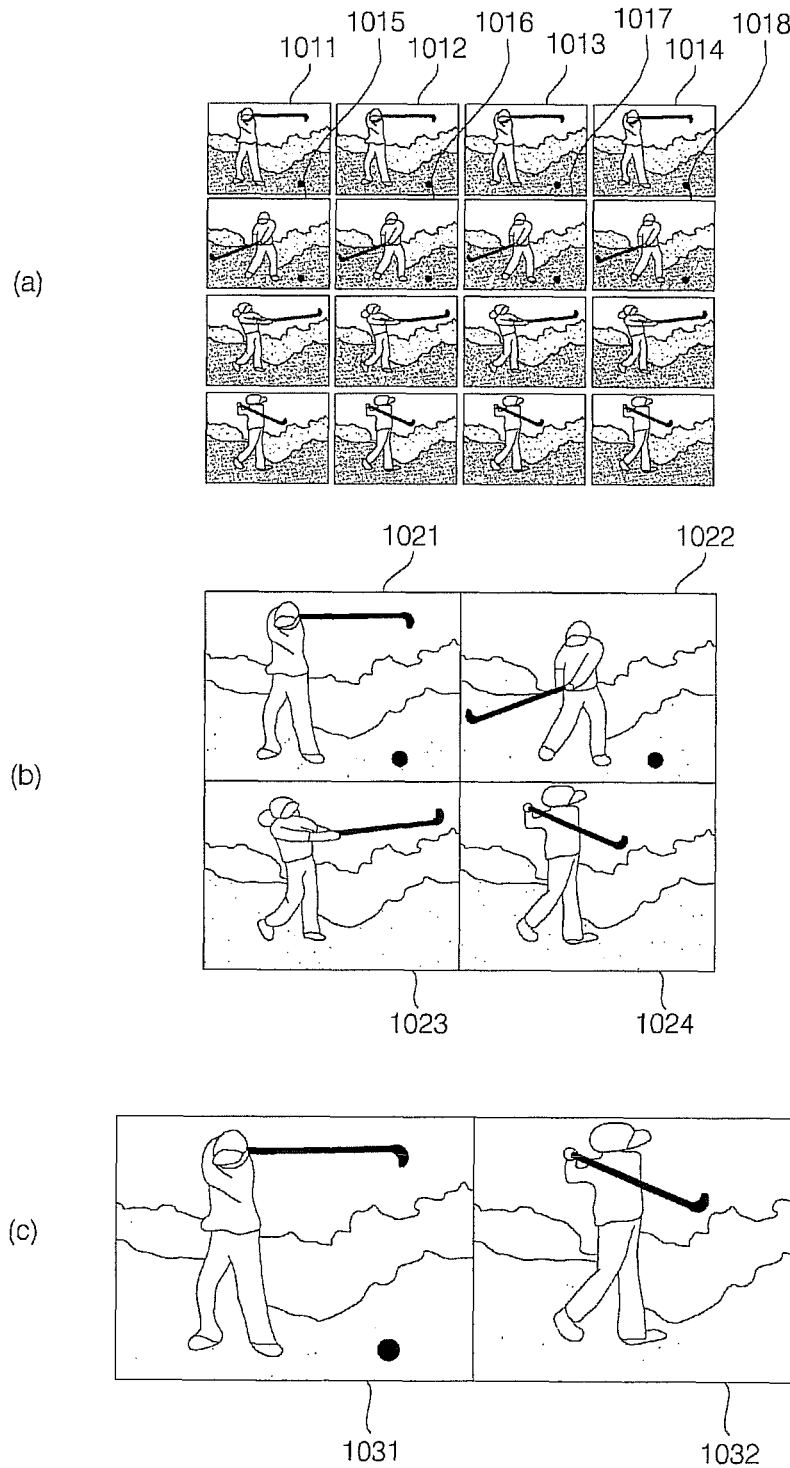

FIG. 9 is a flowchart illustrating methods for operating an array camera and a mobile terminal having the array camera according to an embodiment of the present invention and FIGS. 10 to 25 are views referred to for describing an array camera, a mobile terminal, and methods for operating the array camera and the mobile terminal according to embodiments of the present invention.

Referring to FIG. 9, in the array camera 100 including the plurality of camera modules 121 or the mobile terminal 200 having the array camera 100, a different camera environment setting is applied to at least one of the plurality of camera modules 121 (S910).

For example, when a high-resolution shot condition is set for at least one of the camera modules 121, the camera modules 121 include the camera module having a high-resolution setting and a camera module having a standard-resolution setting. Thus the camera modules 121 may acquire images of different resolutions later.

In another example, if a high-resolution shot condition is set for at least one of the camera modules 121 and a low-resolution shot condition is set for at least one of the camera modules 121, the camera module having a high-resolution setting, the camera having a low-resolution setting, and a camera having the standard-resolution setting coexist in the camera modules 121. Therefore, the camera modules 121 may acquires images of different resolutions later.

That is, two or more different settings may apply to the plurality of camera modules 121 in accordance with an embodiment of the present invention.

In the camera environment setting application step S910, the controller 180 or 280 may apply settings to the plurality of camera modules 121, upon receipt of a setting input from the user or upon loading of a preset setting value corresponding to a user-selected camera mode.

For example, the controller 180 or 280 may receive a manual setting input from the user through a setting menu displayed on the display 151 or 251 or provides the user with a plurality of camera modes to which recommended setting values are applied. Then the controller 180 or 280 may apply a user-input setting or a loaded setting value corresponding to a user-selected mode to each camera module.

Or without receiving a setting input from the user, the controller 180 or 280 may apply a recommended setting automatically according to ambient illuminance, current time, the type of an image to be captured (a video or still image), etc.

Or the controller 180 or 280 may re-use the last user-input or user-selected setting.

The camera environment setting application step S910 is characterized in that the controller 180 or 280 applies a different setting to each of the camera modules 121. For example, if the array camera 100 includes four camera modules, different resolution conditions may be applied to the respective four camera modules. Or it may be set that the four camera modules start to capture images by respective time delays of 1, 2, 3 and 4 seconds.

Subsequently, the controller 180 or 280 may acquire images through the plurality of camera modules 121 to which the two or more settings have been applied in response to a user's shot command (S920) and may combine the acquired images (S930). As the controller 180 or 280 combines video or images captured under at least two different conditions, it can generate higher-quality final data.

In the camera environment setting application step S910, the controller 180 or 280 may control application of different resolution and frame rate settings.

In this case, the controller 180 or 280 may control generation of images having a high resolution and a high frame rate based on images acquired from a camera module to which a low-resolution and high-frame rate shot condition has been applied in the image combining step S930.

For example, at least one of the plurality of camera modules 121 may acquire an image under a low-resolution, fast-shot condition and at least one of the plurality of camera modules 121 may acquire an image under a high-resolution slow-shot condition.

The image captured under the low-resolution, fast-shot condition contains many frames with a relatively low resolution, whereas the image captured under the high-resolution, slow-shot condition contains a relatively small number of frames each frame having a high resolution.

Therefore, the controller 180 or 280 may create more images based on images captured under a low-resolution condition by an algorithm such as interpolation.

In addition, the controller 180 or 280 may generate high-resolution, high-frame rate images by combining or synthesizing low-resolution images with high-resolution images in various manners, referring to timing information about the acquired images. For example, the controller 180 or 280 may insert low-resolution images between high-resolution images, referring to timing information about the low-resolution images.

Further, in order to generate additional high-resolution images and insert them into existing high-resolution images, the controller 180 or 280 may detect image changes in low-resolution images corresponding to a necessary timing period and use the detected image changes in generating an object or area that cannot be created with images captured under a high-resolution condition.

On the contrary, the controller 180 or 280 may replace some objects or areas of images captured under a low-resolution shot condition with images captured under a high-resolution shot condition.

Since the array camera 100 includes the plurality of camera modules 121, it may capture images under more different shot conditions and combine them.

For example, if the array camera 100 includes nine camera modules 121, it may capture the same object under nine different shot conditions at maximum. In this case, the camera modules 121 may acquire images having different frame rates as well as different resolutions, thereby producing images at various timings.

Consequently, a plurality of sample images that differ in resolution and timing can be obtained regarding the same object and a higher-quality image can be created by various known image combining techniques.

For example, the controller 180 or 280 may generate a high-resolution image estimate for a timing period that is absent in images captured under a high-resolution shot condition by combining pixel information about each of low-resolution images captured at timings adjacent to the shot timing of a high-resolution image.

A motion-based super-resolution algorithm is an approach of estimating a motion between low-resolution images, compensating the motion, and then combining pixel values of the low-resolution images, to thereby recover a high-resolution image. Accurate estimation of a motion between images is critical to generation of a high-resolution image by the motion-based super-resolution algorithm. Since the motion estimation gets more accurate with more low-resolution images, the quality of the resulting image depends on the number of low-resolution images.

In this context, the present invention can further increase image quality because a plurality of images, particularly images with various resolutions can be acquired by means of a plurality of camera modules to which different settings are applied.

Considering that final image quality is also significantly affected by the number of sample images in other image combining techniques, the present invention is highly effective in increasing the quality of a composite image.

According to the present invention, an image having a high resolution and a high frame rate can be generated based on an image acquired from a camera module having a low-resolution, fast-shot setting and an image acquired from a camera module having a high-resolution, slow-shot setting.

Accordingly, the present invention provides a method and apparatus for selecting and improving a video quality using images captured through an array camera having different resolutions and frame rates.

To prevent noise and degradation of image quality under low illuminance, observed when an image is captured at a high resolution and a high frame rate, the image quality of a low-frequency area can be improved and an image with a high frame rate can be ensured, by fast shot of low-resolution images based on pixel binning, while a high-frequency area can be recovered and generated by combining images from high-resolution, slow-shot images.

Therefore, the present invention can mitigate resolution limitations involved in fast capturing a video by applying different frame rates to a plurality of camera modules.

In addition, the present invention can produce a high-quality video relative to image quality as achieved in a conventional technology, by means of small-size camera modules or low-price camera modules.

The present invention can acquire a video from which various noise components caused at low illuminance are eliminated and for which degraded image quality attributed to low brightness is improved.

According to the present invention, a user can create videos in various camera modes and selectively store and reproduce the videos. The user can selectively store and reproduce a video with a low resolution, a high frame rate, and less noise and a video with a high resolution and a low frame rate.

In the image combining step S930, a composite image may be generated based on an image acquired from a camera module to which a first setting of a low resolution and a high frame rate has been applied and an image acquired from a camera module to which a second setting of a high resolution and a low frame rate has been applied, and the composite image may be combined with an image acquired from a camera module to which a third setting of a higher resolution and a lower frame rate than the second setting has been applied.

FIG. 10(a) illustrates images 1011 to 1018 acquired from a camera module to which the first setting of a low resolution and a high frame rate has been applied, FIG. 10(b) illustrates images 1021 to 1024 acquired from a camera module to which the second setting of a high resolution and a low frame rate has been applied, and FIG. 10(c) illustrates images 1031 and 1032 acquired from a camera module to which the third setting of a higher resolution and a lower frame rate than the second setting has been applied.

To generate an image for a timing period absent in the images 1021 to 1024 acquired under the intermediate resolution condition, the controller 180 or 280 may refer to the images 1011 to 1018 acquired under the low resolution condition.

The controller 180 or 280 may generate a high-frame rate image having an image quality identical or similar to an intermediate-resolution image using the low-resolution images 1011 to 1014 corresponding to the same timing period as or a similar timing period to that of the two images 1021 and 1022 acquired under the intermediate resolution condition. Likewise, an image corresponding to a specific timing period between the two images 1022 and 1023 may be generated using the low-resolution images 1015 to 1018 corresponding to the timing period.

Figure 11:
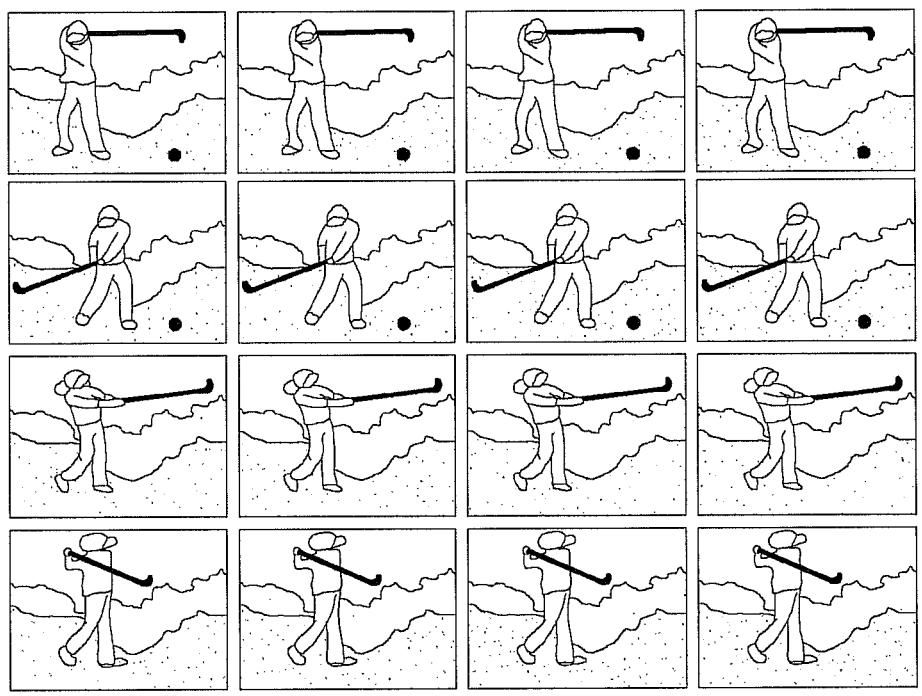

High-resolution, high-frame rate images may be generated by combining composite images resulting from combining the images of the first and second settings with the images 1031 and 1032 of the third setting, as illustrated in FIG. 11. When needed, final composite images may be generated based on all of the composite images and the images captured under various settings, for example, under the first, second and third settings.

Additionally, composite images may be generated using images acquired from a camera module to which a fourth setting different from the third setting has been applied. That is, higher-quality images can be generated by repeating the above operation on images acquired under more other shot conditions.

Images captured under the highest-resolution condition are simply inserted between final composite images. Therefore, when a combined video is to be played back, a timing to which a high-resolution image is available may be indicated to the user so that the user may select the image.

According to an embodiment of the present invention, the user may capture video images simultaneously under various shot conditions by means of the array camera 100 having the plurality of camera modules 121.

The user may freely set a frame rate, a resolution, etc. for each camera module or may load preset values related to shot modes and set the loaded values for the respective camera modules.

If the array camera 100 includes four camera modules, a high-resolution, high-frame rate video with less noise may be acquired using simultaneously captured four videos, that is, high-frame rate images with mitigated noise components and low-frame rate images with high-frequency components.

The methods for operating the array camera and the mobile terminal according to the embodiment of the present invention may further include generation of a depth map based on video images acquired through a plurality of camera modules.

In the array camera according to an embodiment of the present invention, a setting can be applied to each individual camera module. In addition, a different optimized setting can be applied to each camera module depending on the array camera and the mobile terminal are in landscape mode or portrait mode during shots.

The sensor unit 240, particularly the motion sensor 245 in the mobile terminal 200 may sense angle information about the mobile terminal 200. For example, the angle information may be angle information about the mobile terminal 200 with respect to the x, y and z axes.

The gyro sensor of the motion sensor 245 may sense angular velocity information with respect to the x, y and z axes and calculate the angle information with respect to the x, y and z axes based on the angular velocity information.

Alternatively or additionally, the gyro sensor may sense the angular velocity information with respect to the x, y and z axes and the controller 280 may calculate the angle information with respect to the x, y and z axes based on the angular velocity information.

The controller 280 may determine the landscape mode or portrait mode based on a sensing value received from the sensor unit 240 and may control application of a setting on a camera module basis according to the determined mode.

Especially, if a reference camera is designated in order to capture a preview image or a reference image for image combining, the controller 280 may control re-designation of the reference camera depending on the landscape mode or the portrait mode.

For example, in the case of an array camera including four camera modules arranged in a 2×2 matrix, the camera module at position (1, 2) may be designated as a reference camera in the landscape mode and the camera module at position (1, 1) may be designated as a reference camera in the portrait mode.

Or a camera nearest to an object may be designated as a reference camera by locating the object using a depth map.

In accordance with an embodiment of the present invention, at least one of the plurality of camera modules in the array camera may have a lens with a different magnification or type from the other camera modules.

That is, various images may be acquired from the camera modules having different optical lenses in the array camera.

Figure 12:
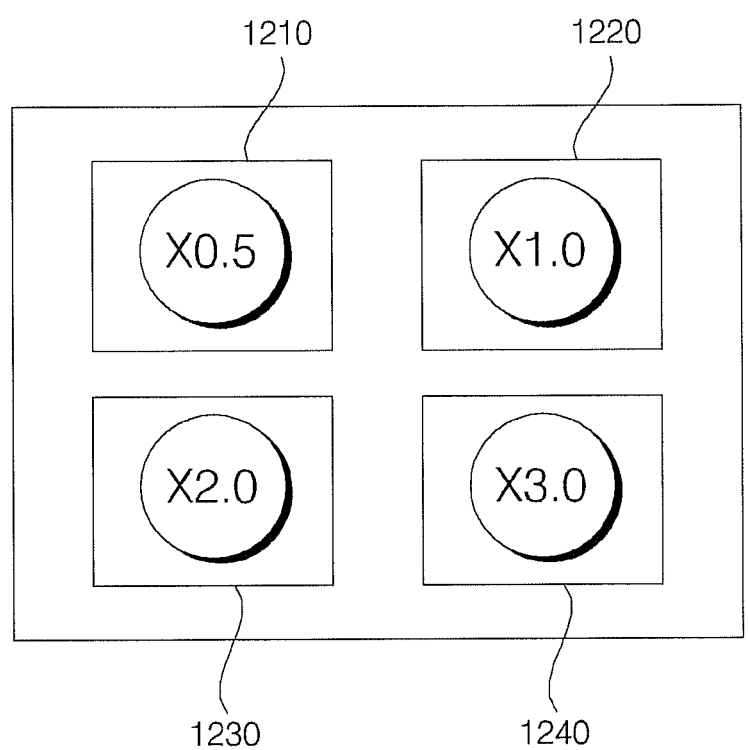
Figure 13:
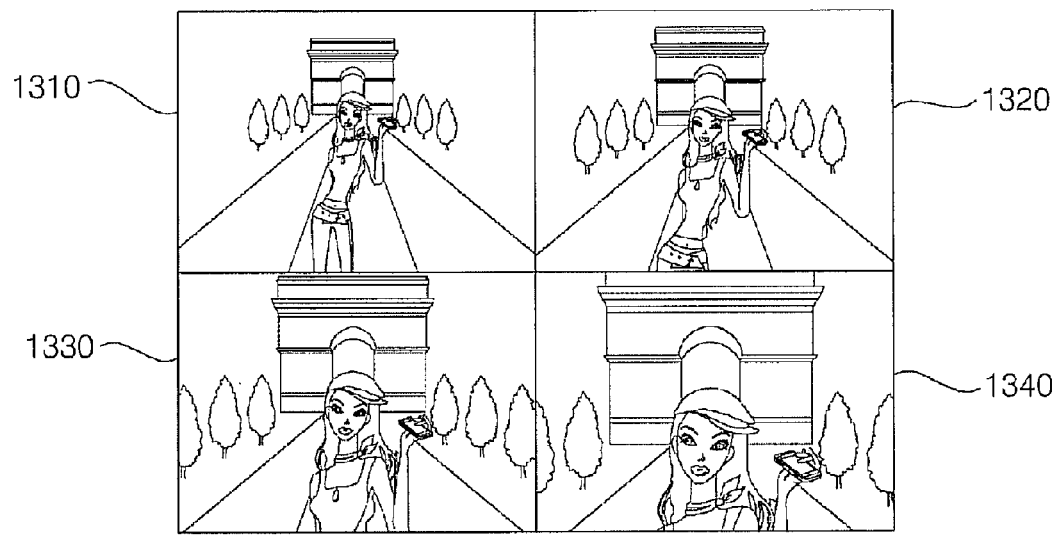
Figure 14:
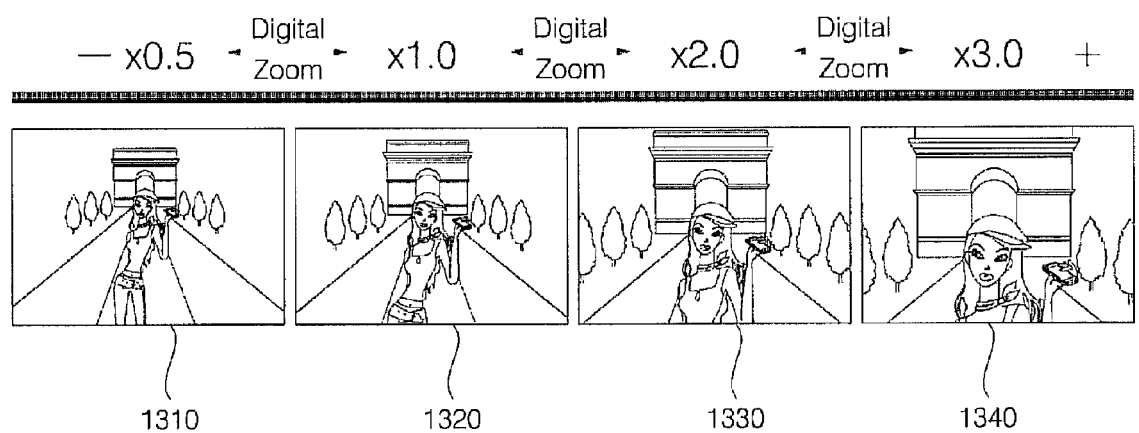
Figure 15:
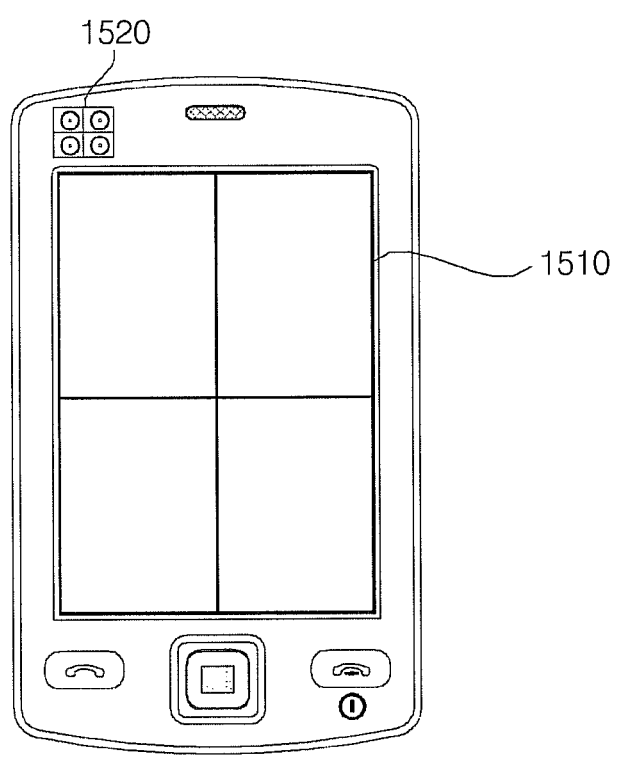
Figure 16:

For example, the array camera 100 may include a lens 1210 having a magnification of ×0.5, a lens 1220 having a magnification of ×1.0, a lens 1230 having a magnification of ×2.0, and a lens 1240 having a magnification of ×3.0, as illustrated in FIG. 12.

A drawback with a small-size camera such as a camera included in a mobile terminal is the difficulty of optical zoom in view of a limited device size.

However, the array camera and the mobile terminal according to the embodiment of the present invention can realize the zoom function by simultaneously using lenses having different magnifications.

Various images 1310, 1320, 1330 and 1340 of the same object may be acquired and stored by means of the lenses having different magnifications 1210, 1220, 1230 and 1240.

When the user enlarges a specific image, an optically zoomed image superior to a digitally zoomed image in terms of image quality may be displayed instead. For example, if the user selects enlargement for the specific image 1320, the enlarged image 1330 may be displayed. If the user selects contraction for the specific image 1320, the contracted image 1310 may be displayed.

During image switching, digital zoom may be intervened between optical zooms to render switching between the optical zooms smooth.

The plurality of camera modules may include different types of lenses. For example, the plurality of camera modules may include a camera module having a wide angle lens and a camera module having a telephoto lens.

A picture may be taken in a customized manner by applying individual settings to the array camera of the present invention.

The user may change individual settings including exposure, angle of view, etc. for the camera modules 121 of the array camera 100 and thus may acquire a natural customized picture through image registration of individual frames acquired through the camera modules 121 to which different settings have been applied.

For example, after applying a setting to each individual camera module, the user may enter a specific shot mode.

Referring to FIGS. 15 to 18, when a specific shot mode is set, at least a partial screen 1510 of the display 151 or 251 may be divided into four grids, that is, upper left, upper right, lower left, and lower right areas. An object 1520 indicating the shot mode may further be displayed in a specific area of the display 151 or 251.

The camera modules 121 of the array camera 100 automatically focus on the upper left, upper right, lower left, and lower right and the display 151 or 251 displays preview images 1611 to 1614 by combining frames acquired from the camera modules 121. Each of the preview images 1611 to 1614 corresponds to one of the camera modules 121.

Figure 17:
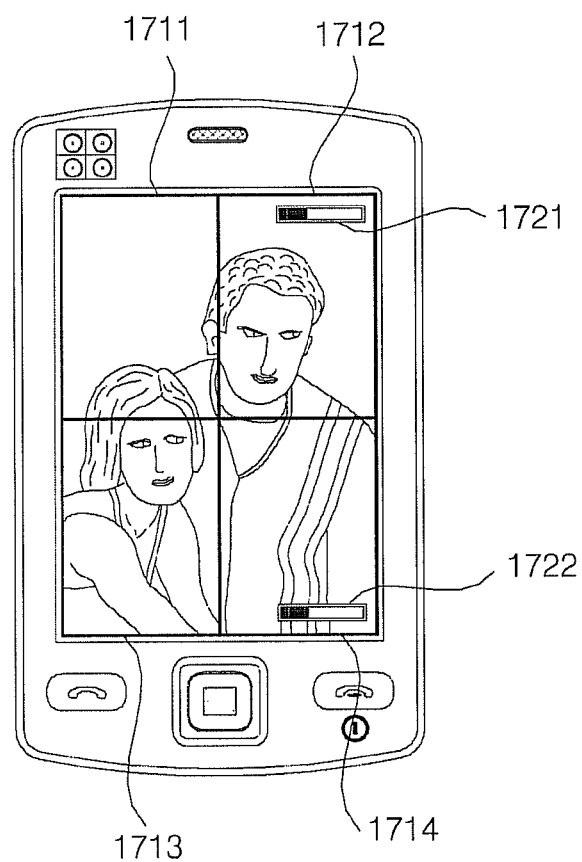

The user may enlarge or contract the individual grid areas. FIG. 17 illustrates an example of displaying, along with objects 1721 and 1722 indicating magnifications, enlarged preview images 1712 and 1714 by enlarging the upper right and lower right areas using the zoom function of the camera modules 121 corresponding to the areas.

Upon user selection of shot, the array camera 100 may combine images acquired from the camera modules 121 and store the composite image, as illustrated in FIG. 18.

In accordance with an embodiment of the present invention, the array camera 100 may include different types of lenses.

For example, a camera module having a wide angle lens may be arranged alternately with a camera module having a telephoto lens in the array camera 100.

Referring to FIG. 19, camera modules having wide angle lenses 1910 and telephoto lenses 1920 may be arranged in a 1×4 matrix as illustrated in FIG. 19(a) or in a 2×2 matrix as illustrated in FIG. 19(b).

In this case, the methods for operating the array camera and the mobile terminal according to the embodiment of the present invention may further include generation of a depth map from images acquired from the camera modules having the wide angle lenses and extraction of an object area from images acquired from the camera modules having the telephoto lenses.

The image combining step S930 may be characterized in that perspective is given to a background based on the depth map and the extracted object area is inserted.

For example, if the wide angle lenses 1910 are arranged alternately with the telephoto lenses 1920, as illustrated in FIG. 19(a), the wide angle lenses 1910 may focus on the background rather than objects, whereas the telephoto lenses 1920 may focus on the objects in the foreground.

FIG. 20(a) illustrates an exemplary image acquired from the wide angle lenses 1910 and FIG. 20(b) illustrates an exemplary image acquired from the telephoto lenses 1920.

The controller 180 or 280 may extract a depth map from the image acquired from the wide angle lenses 1910 and extract a high-resolution object area separately from the image acquired from the telephoto lenses 1920.

In virtue of wide-angle shots, the wide angle lenses 1910 are advantageous in capturing a wide, far landscape. However, it is inconvenient to capture an object such as a person with the wide angle lenses 1910 due to a short distance between the object and the camera.

Despite the ability to take a fine shot of a person, the telephoto lenses 1920 are vulnerable to outfocusing, thereby rendering the background except for the object blurry.

The controller 180 or 280 may give perspective to the background based on the extracted depth map and combine the background with the object area.

Consequently, a high-resolution 3D image may be acquired as illustrated in FIG. 21.

Different exposure settings may be applied to the individual camera modules or individual camera module groups in the camera environment setting application step S910.

Or images at more brightness levels may be captured using a flash. For example, different shot conditions may be set by using or not using the flash or by varying both exposure and flash conditions. Besides exposure settings, images at more brightness levels may be obtained by means of the flash.

Figure 22:
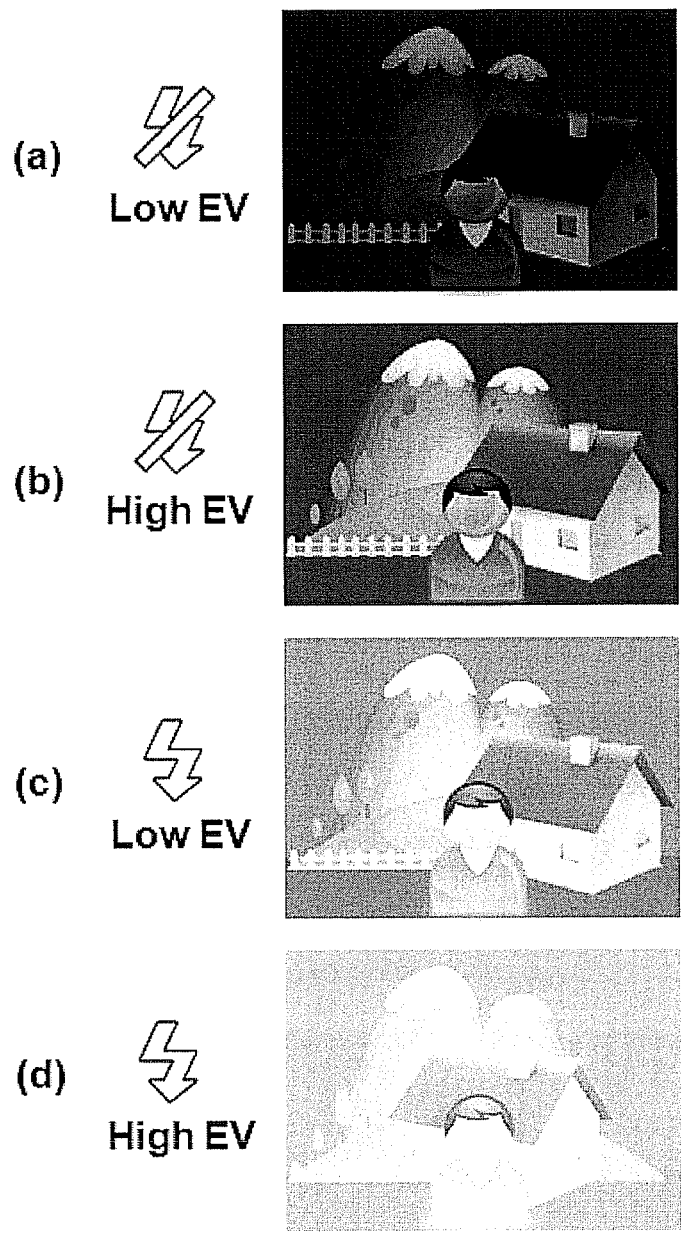

FIG. 22 illustrates examples in which pictures are taken by at least two individual camera modules under different exposure conditions, while turning on or off a flash.

According to an embodiment of the present invention, images having various brightness values may be acquired as illustrated in FIG. 22 and a High Dynamic Range (HDR) image may be created by combining the images having various brightness levels, as illustrated in FIG. 23.

An HDR picture may be generated by taking pictures under various exposure conditions, extracting appropriately exposed pictures, and combining them.

In accordance with an embodiment of the present invention, pictures of different brightness values may be taken using a plurality of cameras and thus an HDR picture may be obtained more rapidly by combining them.

In accordance with an embodiment of the present invention, since the images having various brightness values illustrated in FIG. 22 and the composite HDR picture illustrated in FIG. 23 may be stored for management, various UIs may be provided to the user.

For example, when the user selects a specific area of an image on a UI and applies a directional touch input such as clockwise rotation, counterclockwise rotation, or a left, right, up or down touch, the controller 180 or 280 may brighten or darken the specific area. The controller 180 or 280 may recognize the same area as the selected area and change the brightness of the recognized area to the same level as that of the selected area. The controller 180 or 280 may recognize the area based on the focus difference, step, etc. between the camera modules of the array camera 100.

FIG. 24 illustrates an example in which when the user draws a clockwise circle around a person in an image, the controller 180 or 280 recognizes the person and brightens the person, and FIG. 25 illustrates an example in which when the user draws a counterclockwise circle on a sky in an image, the controller 180 or 280 recognizes the sky and darkens the sky.

As is apparent from the above description, the present invention can apply settings to individual modules of an array camera in various manners.

The present invention enables miniaturization of cameras and can acquire a high-quality image. Further, since various images can be acquired from a plurality of cameras and combined, various user tastes can be satisfied and user convenience can be increased.

The array camera, the mobile terminal, and the methods for operating the same according to the foregoing exemplary embodiments are not restricted to the exemplary embodiments set forth herein. Therefore, variations and combinations of the exemplary embodiments set forth herein may fall within the scope of the present invention.

The present invention may be implemented as code that can be written on a computer-readable recording medium and thus read by a processor in the array camera and the mobile terminal. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating an array camera including a plurality of camera modules, the method comprising:
    applying a different camera environment setting from the other camera modules to at least one of the plurality of camera modules;
    acquiring images through the plurality of camera modules;
    combining the acquired images, wherein at least one of the plurality of camera modules includes a lens of a different magnification or type from the other camera modules, wherein the plurality of camera modules include a camera module having a wide angle lens and a camera module having a telephoto lens that are arranged alternately;
    generating a depth map from an image acquired from the camera module having the wide angle lens; and
    extracting an object area from an image acquired from the camera module having the telephoto lens,
    wherein the combining comprises giving perspective to a background area based on the depth map and inserting the extracted object area.

2. The method according to claim 1, wherein the application comprises applying settings to the plurality of camera modules according to a user setting input or loading of a preset setting value.

3. The method according to claim 1, wherein the application comprises applying a different setting to each of the plurality of camera modules.

4. The method according to claim 1, wherein the application comprises applying a different resolution and frame rate setting to the at least one of the plurality of camera modules.

5. The method according to claim 4, wherein the combining comprises generating a high-resolution, high-frame rate image based on images acquired from a camera module under a low-resolution, fast-shot setting and images acquired from a camera module under a high-resolution, slot-shot setting.

6. The method according to claim 4, wherein the combining comprises generating a composite image based on images acquired from a camera module under a first setting of a low resolution and a high frame rate and images acquired from a camera module under a second setting of a high resolution and a low frame rate relative to the first setting.

7. The method according to claim 6, wherein the combining further comprises generating the composite image based on images acquired from a camera module under a third setting of a high resolution and a low frame rate relative to the second setting.

8. The method according to claim 1, further comprising generating a depth map based on images acquired through the plurality of camera modules.

9. The method according to claim 1, wherein the application comprises applying a different exposure setting to the at least one of the plurality of camera modules.

10. A method for operating a mobile terminal having an array camera including a plurality of camera modules, the method comprising:
    applying a different camera environment setting from the other camera modules to at least one of the plurality of camera modules;
    acquiring images through the plurality of camera modules;
    combining the acquired images, wherein at least one of the plurality of camera modules includes a lens of a different magnification or type from the other camera modules, wherein the plurality of camera modules include a camera module having a wide angle lens and a camera module having a telephoto lens that are arranged alternately;
    generating a depth map from an image acquired from the camera module having the wide angle lens; and
    extracting an object area from an image acquired from the camera module having the telephoto lens,
    wherein the combining comprises giving perspective to a background area based on the depth map and inserting the extracted object area.

11. The method according to claim 10, wherein the application comprises applying settings to the plurality of camera modules according to a user setting input or loading of a preset setting value.

12. The method according to claim 10, wherein the application comprises applying a different setting to each of the plurality of camera modules.

13. The method according to claim 10, wherein the application comprises applying a different resolution and frame rate setting to the at least one of the plurality of camera modules.

14. The method according to claim 13, wherein the combining comprises generating a high-resolution, high-frame rate image based on images acquired from a camera module under a low-resolution, fast-shot setting and images acquired from a camera module under a high-resolution, slot-shot setting.

15. The method according to claim 14, wherein the combining comprises generating a composite image based on images acquired from a camera module under a first setting of a low resolution and a high frame rate and images acquired from a camera module under a second setting of a high resolution and a low frame rate relative to the first setting.

16. The method according to claim 15, wherein the combining further comprises generating the composite image based on images acquired from a camera module under a third setting of a high resolution and a low frame rate relative to the second setting.

17. The method according to claim 10, further comprising generating a depth map based on images acquired through the plurality of camera modules.

* * * * *